(12) United States Patent
Kim et al.

(10) Patent No.: US 8,094,444 B2
(45) Date of Patent: Jan. 10, 2012

(54) SLIDING TYPE PORTABLE ELECTRONIC DEVICE

(75) Inventors: Won-Tae Kim, Suwon-si (KR);
Jin-Seok Park, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 12/191,620

(22) Filed: Aug. 14, 2008

(65) Prior Publication Data

US 2009/0052145 A1    Feb. 26, 2009

(30) Foreign Application Priority Data

Aug. 20, 2007    (KR) .................. 10-2007-0083349

(51) Int. Cl.
*H05K 5/00* (2006.01)
*H05K 7/00* (2006.01)

(52) U.S. Cl. ........... 361/679.3; 361/679.02; 361/679.26; 361/679.55; 361/679.56; 455/575.4

(58) Field of Classification Search ............. 361/679.01, 361/679.3, 679.56, 728, 679.02, 679.26, 361/679.55; 455/575.4
See application file for complete search history.

(56) References Cited

U.S. PATENT DOCUMENTS 7,003,104 B2 * 2/2006 Lee .......................... 379/433.13
2008/0064456 A1 * 3/2008 Cha et al. ................... 455/575.4

* cited by examiner

*Primary Examiner* — Anthony Haughton
(74) *Attorney, Agent, or Firm* — H.C. Park & Associates, PLC

(57) ABSTRACT

A portable electronic device includes a first housing: a second housing coupled with the first housing such that the second housing can slide while facing the first housing, guide ribs arranged on the first housing, guide slits arranged on the second housing, and at least one protuberance arranged on either an outer surface of each guide rib and an inner wall of each guide slit. The guide slits extend along a direction in which the second housing slides and each guide rib is restricted in each guide slit so as to guide a sliding movement of the second housing. The at least one protuberance contacts either an inner wall of each guide slit or an outer surface of each guide rib.

19 Claims, 5 Drawing Sheets

SLIDING TYPE PORTABLE ELECTRONIC DEVICE

CROSS REFERENCE TO RELATED APPLICATION

This application claims priority from and the benefit of Korean Application No. 10-2007-0083349, filed on Aug. 20, 2007, which is hereby incorporated by reference for all purposes as if fully set forth herein.

BACKGROUND OF THE INVENTION

1. Field of the Invention

The present invention relates to a portable electronic device, and more particularly to a portable electronic device, which has a pair of housings assembled to face each other with one housing being slidable on the other housing to open/close a part of the other housing.

2. Discussion of the Background

In general, portable electronic devices, such as a mobile phone, an electronic scheduler, a palm PC, or a portable game device, allow a user to communicate with other users, store information, use multimedia contents, etc. The most typical device among such portable devices is a mobile phone. Due to a technique which achieves size-reduction and integration, as well as a typical communication function such as voice calls, other functions such as an electronic scheduling, playing games, storing and regenerating music/moving picture, and photographing a picture and a moving picture may be added to a mobile phone.

Such a portable electronic device can be classified as a bar-type device, a flip-type device, or a folder-type device according to the external appearance thereof. The bar-type device includes a single housing having a bar-shape. The flip-type terminal includes a flip or a cover rotatably coupled to a bar-type housing. The folder-type device includes a pair of folders that are rotatably coupled. A swing-type device, which includes a pair of housings that are rotatably coupled to each other and face each other, have been introduced, in an attempt to satisfy various user demands.

The folder-type device and the sliding-type device have input/output devices arranged at a pair of housings, respectively, and may provide for better portability and greater convenience because they can be carried in a state where the housings are folded on each other and can be used in a state where the housings are unfolded from each other. For these reasons, the folder-type device and the sliding-type device occupy much of the market of portable electronic devices such as mobile phones The sliding-type device was developed after the folder-type device, but it has the advantages of a folder-type device, and also has convenience in opening and closing operations. Therefore, sliding type devices have overtaken folder-type devices in the market.

However, the sliding-type device has a disadvantage in that discomfort may be caused by noise due to friction generated between housings during a sliding operation, and its durability may be deteriorated due to abrasion. In order to resolve this problem, there has been an effort to decrease friction generated during a sliding operation by providing space between the housings. However, when clearance is generated between the housings, unnecessary movement between the housings may occur. As a result, a method of decreasing friction that can also restrict unnecessary movements of the housings of the sliding-type device, thereby preventing noise and abrasion, is needed.

SUMMARY OF THE INVENTION

The present invention provides a sliding type-portable electronic device that may reduce friction generated by sliding movement of housings.

The present invention also provides a sliding type-portable electronic device, which may reduce friction generated by sliding movement of housings, thereby lessening noise and abrasion.

The present invention also provides a sliding type-portable electronic device, which may prevent unnecessary movement of housings and provide a smooth sliding movement.

Additional features of the invention will be set forth in the description which follows, and in part will be apparent from the description, or may be learned by practice of the invention.

The present invention discloses a portable electronic device including a first housing, a second housing coupled with the first housing such that the second housing can slide while facing the first housing, guide ribs arranged on the first housing, guide slits arranged on the second housing, and at least one protuberance arranged at one of an outer surface of each guide rib and an inner wall of each guide slit. Each guide slit extends along a direction in which the second housing moves, and each guide rib is restricted in a respective guide slit so as to guide sliding movement of the second housing. The at least one protuberance contacts either the inner wall of each guide slit or the outer surface of each guide rib.

The present invention also discloses a portable electronic device including a first housing, a second housing coupled with the first housing such that the second housing can slide while facing the first housing, guide ribs arranged on the first housing, slit covers extending along a direction in which the second housing slides, and a plurality of protuberances arranged on the outer peripheral surface of each guide rib. Each slit cover surrounds an outer peripheral surface of the guide ribs, respectively. Each guide rib is restricted by each slit cover to guide a sliding movement of the second housing, and the protuberances contact an inner wall of each slit cover.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
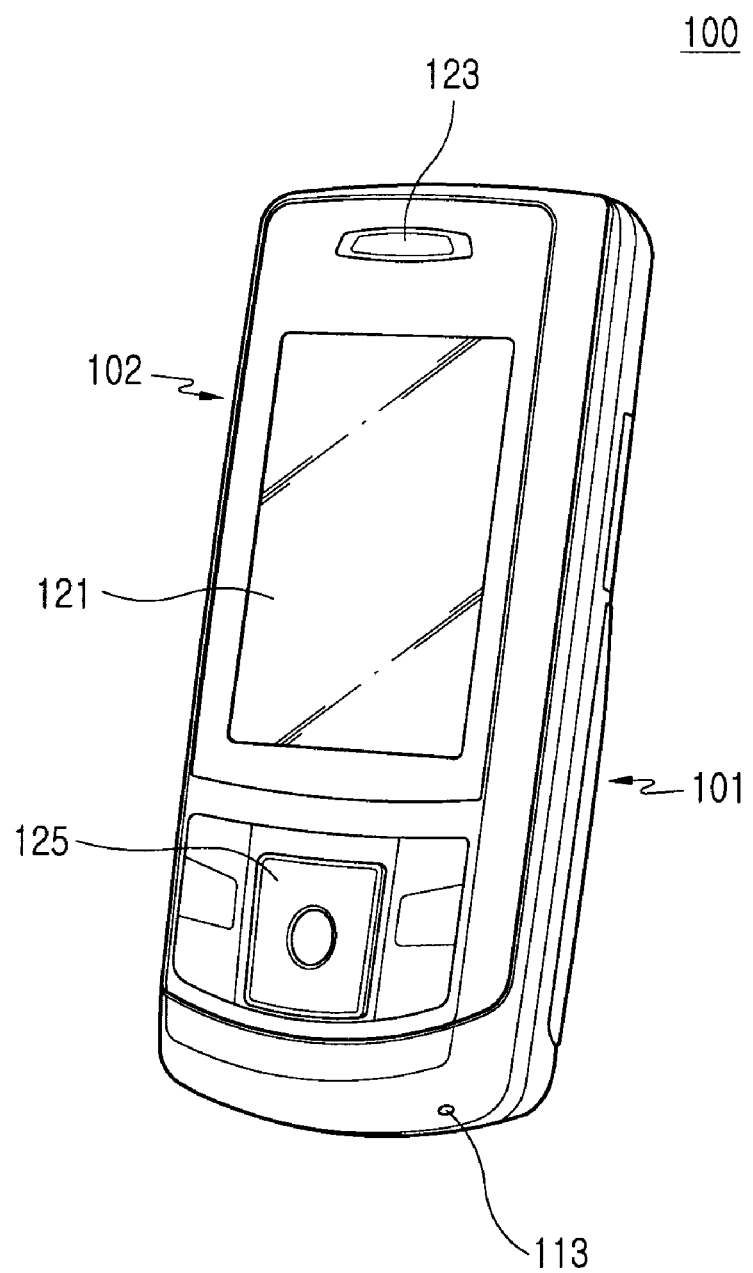
FIG. 1 is a perspective view of a portable electronic device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Figure 2:
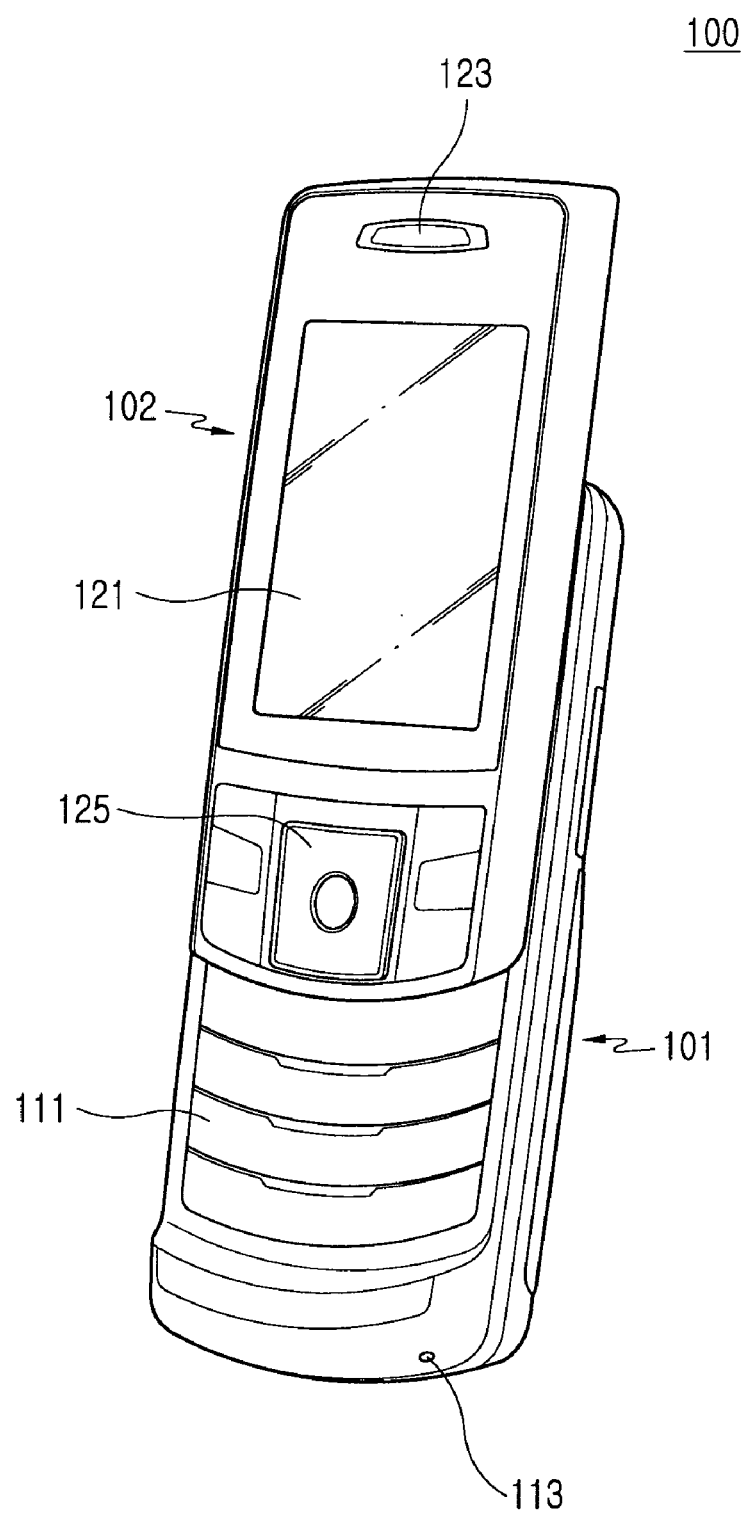
FIG. 2 is a perspective view of the portable electronic device shown in FIG. 1, in which a second housing has slid to open the first housing.

As shown in FIG. 1 and FIG. 2, a portable electronic device 100 according to an exemplary embodiment of the present invention is a sliding type portable electronic device having a pair of housings assembled with each other such that they can slide while facing each other. The portable electronic device 100 is shown as a mobile phone.

The portable electronic device 100 includes a first housing 101, at which a keypad 111 and a transmitting part 113, are installed, and a second housing 102 assembled with the first housing 101 such that the second housing 102 slides thereon while facing the first housing 101. The second housing 102 has one surface, at which an input device, such as a display device 121 and a receiving part 123, is installed. Also, according to the type of product, a functional keypad 125 may be installed at a lower side of the display device 121. According to sliding of the second housing 102, a first surface of the first housing 101 may be opened/closed. The keypad 111 is installed at an area that is opened/closed according to the slide movement of the second housing 102.

In addition, the closed state of the remaining area of the first surface of the first housing 101, where the keypad 111 is not installed, is always maintained regardless of sliding movement of the second housing 102. A guide member 201, which will be described below, is installed at the corresponding area.

The second housing 102 is provided with a driving force from an elastic member 203 (see FIG. 3), which acts in a direction that the second housing 102 slides to open or close the keypad 111.

Figure 3:
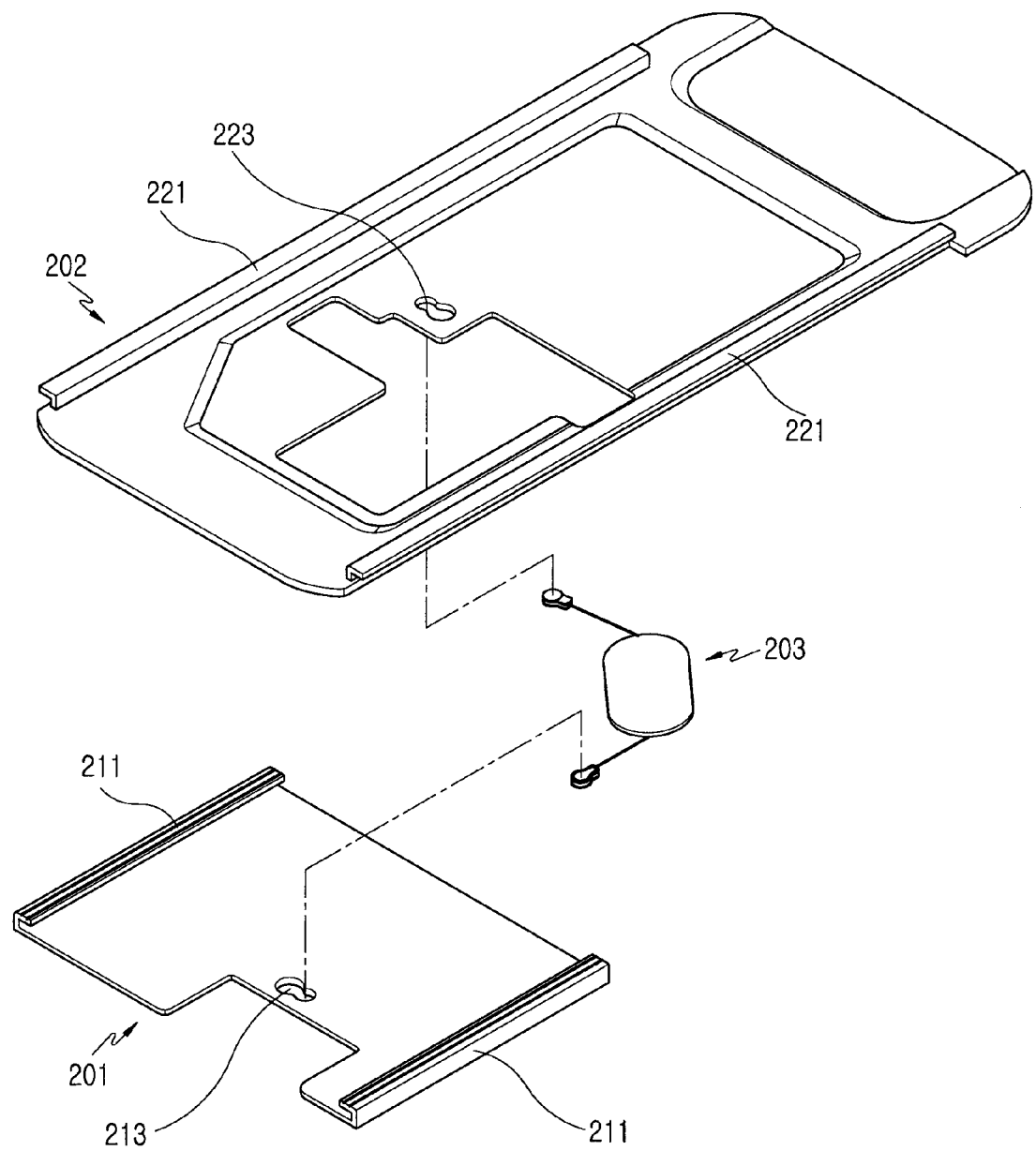
FIG. 3 is an exploded perspective view showing how the housings of the portable electronic device shown in FIG. 1 are assembled.
Figure 4:
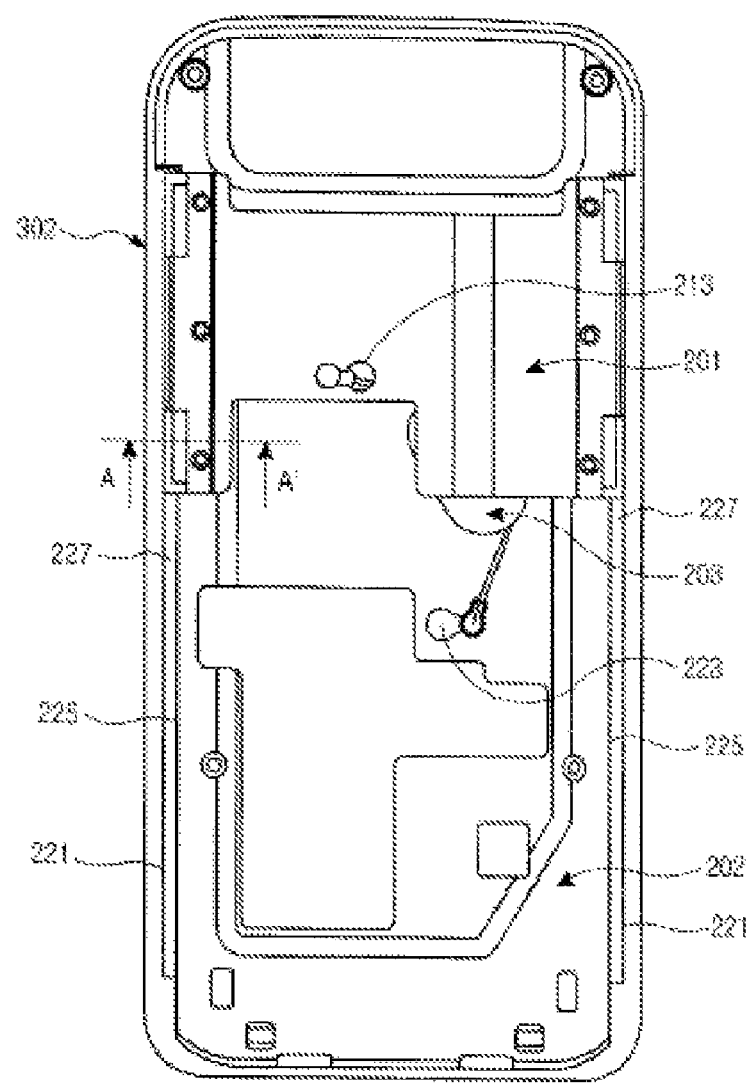
FIG. 4 is a plan view showing the housings of the portable electronic device shown in FIG. 3 once they are assembled.

With reference to FIG. 3 and FIG. 4, in order to assemble the first and second housings 101 and 102 such that they can slide, a guide member 201 is installed at the first housing 101, and a guide rib 211 is formed at each side of the guide member 201, and extends toward the inside of the second housing 102. Each guide rib 211 has an end part, which is bent so as to allow the first and second housings 101 and 102 to slide along the guide rib 211.

A guide rib 211 is formed at each side of the guide member 201. The guide ribs 211 extend from each side of the first surface of the guide member 201 to face each other and each have an end bent in a direction toward the other guide rib 211. The guide ribs 211 extend toward the inside of the second housing 102 through guide slits formed at a second surface of the second housing 102 that is opposite the first surface, and each have a side bent to face an inner surface of the second housing 102.

In FIG. 3, only a rear case 202 of the second housing 102 is shown, and the guide slits are formed such that both sides 225 of the rear case 202 and an inner surface of the front case are spaced from each other when a front case 302 (FIG. 4. and FIG. 5) of the second housing 102 and the rear case 202 are assembled with each other. Accordingly, each guide slit is formed to be adjacent to a side of the second housing 102 and extends along a direction in which the second housing 102 slides.

When the guide member 201 is assembled with the second housing 102, the sides 225 of the rear case 202 are disposed between the bent sides of the respective guide ribs 211 and the first surface of the guide member 201. Therefore, the second housing 102 slides along a direction in which the guide slits extend when the second housing 102 is assembled with the first housing 101. As a result, the guide ribs 211 are assembled such that they surround the sides 225 of the rear case 202 to restrict the first and second housings 101 and 102.

Although a structure in which the guide member 201 is manufactured as a separate part from the first housing 101 has been described, the guide member 201 may alternatively be a part manufactured integrally with the first housing 101. That is, if the guide member 201 and the first housing 101 are made of the same material, such as metal or synthetic resin, they may be manufactured as an integral type component by a method such as die-casting or injection molding. Also, even if the first housing 101 is made from synthetic resin, and the guide member 201 is made from metal, it may be possible to manufacture an integral form of the first housing 101 and the guide member 201 such that the guide member 201 is first manufactured and installed within a mold used for forming the first housing 101, and double-injection molding is performed.

When the rear case 202 is assembled with the front case, the guide slits are formed between the inner peripheral surface of the front case and each side 225 of the rear case 202. Accordingly, each guide rib 211 extends toward the inside of the second housing 102 through a respective guide slit.

The guide slit 227 (FIG. 5) provides a space, through which the guide rib 211 extends, so as to connect an interior part and an exterior part of the second housing 102 to the guide rib 211. In order to prevent the exterior part of the second housing 102 from coming into the interior part of the second housing 102 through the guide slits, slit covers are formed at an inner surface of the rear case 202. Each slit cover 221 has a side in contact with the inner surface of the front case 302 (FIG. 5) while surrounding an outer peripheral surface of each guide rib 211, so that the slit cover 221 closes the interior of the second housing 102. As a result, each guide slit is surrounded by a respective side 225 of the rear case 202, an outer wall of the slit cover 221, and the inner surface of the front case 302. Hereinafter, an inner wall of a space receiving the guide rib 211, i.e. a part of the inner surface of the second housing 102, the outer wall of the slit cover 221, and the inner surface of the front case 302 is referred to as "an inner wall of the guide slit." "The part of the inner surface of the second housing 102" refers to the inner surface of each side 225 of the rear case 202.

Figure 5:
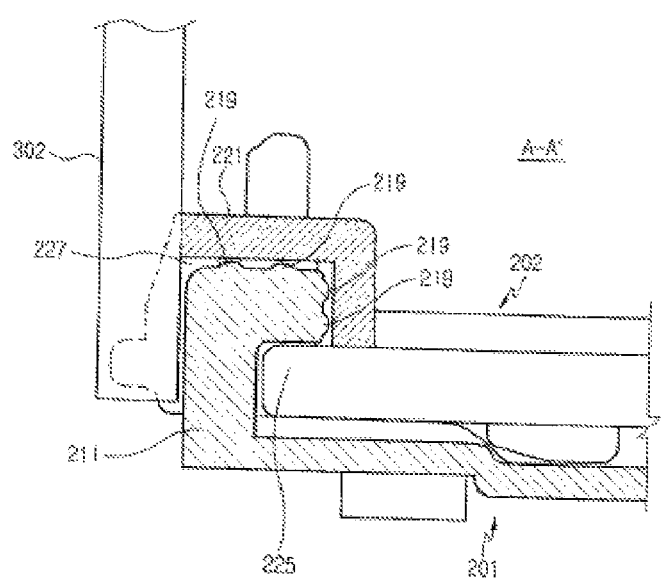
FIG. 5 is a sectional view taken along line A-A' of FIG. 4.

When the second housing slides, friction is generated between the outer surface of the guide rib 211 and the inner wall of the guide slit. With reference to FIG. 5, in order to decrease friction and prevent movement between the first and second housings 101 and 102, at least one protuberance 219 is formed at the outer surface of each guide rib 211 or at the inner wall of each guide slit. According to the present exemplary embodiment, two pairs of protuberances 219 are arranged at outer surfaces of the guide rib 211 at intervals such that they face the inner wall of the guide slit. The number of the protuberances 219 and arrangement thereof may be variously changed according to the type of product.

The protuberances 219 are formed at outer surfaces of the guide rib 211 so that the outer surfaces of the guide rib 211 do not directly contact the inner wall of the guide slit, and a part of the outer surface of each protuberance 219 contacts the inner wall of the guide slit. Therefore, an area, at which friction is generated, may be reduced while the second housing 102 slides so that noise and abrasion may be decreased. The protuberances 219 extend along a movement direction of the second housing 102. As shown in FIG. 5, one pair of protuberances 219 protrudes upward, and the other pair of protuberances 219 protrudes inward. The protuberances 219 protruding upward restrict forward and backward movement of the second housing 102, and the protuberances 219 protruding inward restrict sideways movement of the second housing 102.

In additional, a lubricant may be applied between the outer surface of the guide rib 211 and the inner surface of the guide slit. Therefore, it may be possible to further reduce the amount of friction generated while the second housing 102 slides. When applying a lubricant between the outer surface of the guide rib 211 and the inner surface of the guide slit, it may be possible to fill a lubricant in the inner space of the guide slit. However, since the guide slit doesn't have a completely closed space, when the inner space of the guide slit is filled with a lubricant, the lubricant may leak out. Therefore, the lubricant should be applied only between the protuberances 219 to prevent the lubricant from leaking out of the guide slit.

When the second housing 102 assembled with the first housing 101 is slid by the rear case 202 and the guide member 201, particularly by the guide rib 211, the guide rib 211 moves along the guide slit and the walls of the ends of the guide slit restrict the sliding movement range of the second housing 102. That is, when the keypad 111 is closed as shown in FIG. 1, the walls of the upper ends of the guide slits restrict the respective guide ribs 211, and when the keypad 111 is opened as shown in FIG. 2, the walls of the lower ends of the guide slits restrict the respective guide ribs 211.

In order to provide a driving force according to the position of the second housing 102 while the second housing 102 slides, the portable electronic device 100 may include an elastic member 203. The elastic member 203 may have a first end supported by the first housing 101, particularly by the guide member 201, and a second end supported by the rear case 202 of the second housing 102, so as to provide a driving force in a direction in which the ends move away from each other. In order to support the ends of the elastic member 203, supporting holes 213 and 223 are formed at the guide member 201 and the rear case 202, respectively. While the second housing 102 slides, the ends of the elastic member 203 approach or move away from each other. When the ends of the elastic member 203 are positioned side by side within the range of sliding movement of the second housing 102 in a direction perpendicular to a direction that the second housing 102 moves, they approach each other. As a result, a place where the both ends of the elastic member 203 approach each other exists within the range of sliding movement of the second housing 102.

The elastic member 203 includes a case to receive a pair of coils, and each coil has a structure formed by extending each free end. Each free end is supported by the guide member 201 and the rear case 202 and is provided with elastic force from each coil. Alternatively, the elastic member may be a torsion spring having ends that extend away from one coil, a wire spring having a zig-zag shape, a compressed coil spring, a push rod, or any other elastic member that can exert an elastic force in a direction in which ends thereof move away from each other.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A portable electronic device, comprising:
a first housing;
a second housing slidably coupled with the first housing and facing the first housing;
guide ribs arranged on the first housing;
guide slits arranged on the second housing, the guide slits extending along a direction in which the second housing slides; and
at least one protuberance arranged at either an outer surface of each guide rib or an inner wall of each guide slit,
wherein each guide rib is restricted in each guide slit to guide a sliding movement of the second housing, and the at least one protuberance contacts the inner wall of each guide slit or the outer surface of each guide rib, and
wherein the at least one protuberance travels unobstructed along the length of the inner wall of each guide slit or the outer surface of each guide rib.

2. The portable electronic device of claim 1, wherein the guide ribs are stopped by walls of both ends of each guide slit to limit movement of the second housing.

3. The portable electronic device of claim 1, wherein the guide ribs are arranged at both side ends of the first housing, the guide slits are adjacent to respective side ends of the second housing such that the guide ribs are adjacent to respective side ends of the second housing.

4. The portable electronic device of claim 1, wherein the second housing slides in a up direction and a down direction of the first housing, and the at least one protuberance contacts either the inner wall of each guide slit or the outer surface of each guide rib so as to restrict forward movement, backward movement, and sideways movement of the second housing respective to the first housing.

5. The portable electronic device of claim 1, further comprising a lubricant within the guide slits.

6. The portable electronic device of claim 5, wherein the device comprises at least two protuberances and the lubricant is applied between the at least two protuberances.

7. The portable electronic device of claim 1, wherein the device comprises at least two protuberances, each protuberance has a shape extending along a direction in which the second housing slides, and the at least two protuberances are arranged at outer surfaces of the guide ribs and face inner walls of the guide slits.

8. The portable electronic device of claim 7, further comprising a lubricant between the at least two protuberances.

9. The portable electronic device of claim 1, wherein the device comprises at least two protuberances, each protuberance has a shape extending along a direction in which the second housing slides, and the at least two protuberances are arranged at inner walls of the guide slits and face outer surfaces of the guide ribs according to movement of the second housing.

10. The portable electronic device of claim 9, further comprising a lubricant applied between the at least two protuberances.

11. The portable electronic device of claim 1, further comprising a guide member installed at one surface of the first housing, wherein the guide ribs are arranged at each side of the guide member.

12. The portable electronic device of claim 1, further comprising an elastic member having a first end supported by a surface of the first housing and a second end supported by a surface of the second housing, the elastic member operating in a direction in which the first end and the second end move away from each, wherein the first end and the second end of the elastic member approach or move away from each other according to a slide movement of the second housing.

13. The portable electronic device of claim 12, further comprising a guide member installed at the first housing, wherein the first end of the elastic member is assembled with the guide member and the elastic member rotates about the first end.

14. The portable electronic device of claim 13, wherein the guide ribs are arranged on both sides of the guide member.

15. The portable electronic device of claim 1, wherein the second housing comprises an interior and an exterior, and the guide slits are open to the exterior; and
   the portable electronic device further comprises slit covers to close the interior of the second housing.

16. The portable electronic device of claim 1, wherein the guide slits open in a surface of the second housing facing the first housing.

17. A portable electronic device, comprising:
   a first housing:
   a second housing slidably coupled with the first housing and facing the first housing;
   guide ribs arranged on the first housing;
   slit covers extending along a direction which the second housing slides, each slit cover surrounding an outer peripheral surface of the guide ribs, respectively; and
   a plurality of protuberances arranged on the outer peripheral surface of each guide rib,
   wherein each guide rib is restricted by each slit cover to guide a sliding movement of the second housing, and the protuberances contact an inner wall of each slit cover, and
   wherein the at least one protuberance travels unobstructed along the length of the inner wall of each guide slit or the outer surface of each guide rib.

18. The portable electronic device of claim 17, wherein the outer peripheral surface comprises a first part and a second part, each of the first part and the second part comprising a pair of the protuberances.

19. The portable electronic device of claim 18, wherein the first part and the second part are at a right angle to each other.

* * * * *